United States Patent [19]
Reed

[11] Patent Number: 5,260,566
[45] Date of Patent: Nov. 9, 1993

[54] SELF-POWERED FIBER OPTIC MICROBEND SENSORS

[75] Inventor: Stuart E. Reed, Homeworth, Ohio

[73] Assignee: The Babcock & Wilcox Company, New Orleans, La.

[21] Appl. No.: 897,715

[22] Filed: Jun. 12, 1992

[51] Int. Cl.$^5$ ............................................. H01J 5/16
[52] U.S. Cl. ........................... 250/227.16; 250/458.1; 385/12
[58] Field of Search ...................... 250/227.16, 227.18, 250/227.23, 231.10, 458.1; 385/12, 127

[56] References Cited

U.S. PATENT DOCUMENTS

| | | | |
|---|---|---|---|
| 4,943,714 | 7/1990 | Levacher et al. | 250/227.16 |
| 5,096,277 | 3/1992 | Kleinerman | 385/127 |

Primary Examiner—David C. Nelms
Attorney, Agent, or Firm—Daniel S. Kalka; Vytas R. Matas; Robert J. Edwards

[57] ABSTRACT

A sensor comprises an optical sensor fiber which has a microbend module engaged thereto. When the module is subjected to external influences such as pressure, displacement or the like, it places microbends in the sensor fiber which changes a light transmission characteristic of the fiber. Light passing through the sensor fiber is detected, and changes in the light are measured to find the influence on the modulator. A scintillating or florescent source fiber connected to one end of the sensor fiber is exposed to radiant energy. This produces light which is channeled to the sensor fiber as the light source for the sensor fiber.

12 Claims, 3 Drawing Sheets

SELF-POWERED FIBER OPTIC MICROBEND SENSORS

BACKGROUND OF THE INVENTION

1. Field of the Invention

The present invention relates in general to microbend sensors, and in particular to a new and useful sensor which utilizes scintillating or fluorescing optical fibers as a source of light for such sensors.

2. Description of the Related Art

Optical fiber microbend sensors such as accelerometers, pressure transducers, displacement transducers and strain gages function by modulating the intensity of light in an optical fiber and relating the change in intensity to changes in the sensed parameter. Light from an LED, laser diode or other light source is provided to the sensor through an optical fiber. The light is modulated by the sensor and is returned to detecting optoelectronics. Various architectures have been devised to accomplish this supply of light to the sensor and return of the modulated signal, as shown in FIGS. 1 through 4. Commonly, the source and detection electronics and optics are incorporated in the same enclosure.

Sensors which operate in the "throughput" mode require two optical fibers (10, 12) between the optoelectronic (14) and the sensor (16) as shown in FIG. 1. Fiber (10) transmits the light from the source (14) to the sensor (16), and fiber (12) transmits the modulated light from the sensor (16) to detection means (26). This architecture provides for relatively low insertion loss and simplicity in the optoelectronics. "Single-ended" sensors as shown in FIG. 2, incorporate a retroreflector or mirror in the sensor (16) and require only a single fiber (11) between the optoelectronic (14) and the sensor, generally at the expense of higher insertion losses and increased complexity of the optoelectronics which now require a coupler (18). These two architectures are commonly known in the art and are the basis for virtually all intrinsic fiber optic sensors.

FIG. 3 shows a second example of the single ended sensor architecture and FIG. 4 shows a second example of the throughput version of conventional sensor architectures.

SUMMARY OF THE INVENTION

Optical fibers are now commercially available which scintillate or fluoresce in the visible light range when exposed to visible, ultraviolet or harder radiation (such as X-rays and nuclear radiation). In the present invention, a length of such fiber is used as the light source for the microbend sensor or other fiber optic sensor. This "source" fiber is coupled to the sensing fiber in the sensor itself, eliminating the need for the optical source in the optoelectronics and the supply fiber between the optoelectronics and the sensor. Depending on the application, the energy to excite the source fiber can be provided through a window in the case or from a radioactive source within the sensor case, as a coating for the fiber or the inside of the case, or as a "point" source which irradiates the source fiber.

The present invention can be incorporated into any sensor which is based on intensity modulation, and thus is applicable to accelerometers, pressure transducers, displacement transducers, strain gages or other fiber optic transducer types. By eliminating the need for an optical source in the optoelectronics, the cost, complexity and power requirements of the optoelectronics can be substantially reduced. In addition, the loss budget is reduced and potentially fewer optical fibers and optical components are required in the system. Calculations show that use of a low level radioactive source to energize the source fiber can provide sufficient source brightness, resolution and stability so that simple optoelectronics will be adequate for many applications. Because the optical source and its power supplies and regulators are frequently the major power consuming elements in optoelectronics, elimination of the optical source and related components through application of this invention should result in an improvement in the noise characteristic of the optoelectronics, and should permit the development of compact, simple low cost, accurate and reliable battery operated optoelectronics.

Accordingly, an object of the present invention is to provide a sensor comprising: an optical sensor fiber for passing light with a transmission characteristic, the transmission characteristic changing if the sensor fiber is subjected to microbending; a microbend modulator operatively engaged with the sensor fiber for placing a microbend in the sensor fiber in response to an influence on the modulator to be sensed; photodetection means operatively connected to the sensor fiber for measuring changes in light from the sensor fiber caused by the microbend which is indicative of the influence; and a source fiber having one end connected to an end of the sensor fiber for supplying light to the sensor fiber, the source fiber producing light in the visible light range when exposed to energy radiated at the source fiber.

Another object of the present invention is to provide a method of supplying light to an optical microbend sensor which comprises attaching one end of a source fiber to an end of the sensing fiber in the microbend sensor and exposing the source fiber to energy which causes the source fiber to produce light in the visible light range.

A further object of the present invention is to provide a method of supplying light to an optical microbend sensor which comprises attaching one end of a source fiber to an end of the sensing fiber in the microbend sensor and exposing the source fiber to energy which causes the source fiber to produce light in the visible light range.

A still further object of the invention is to provide a microbend sensor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENT

Figure 1:
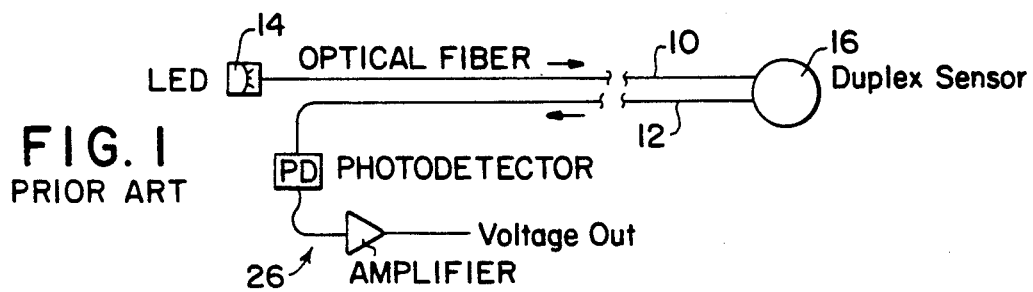
FIG. 1 is a schematic representation of a conventional sensor architecture using two optical fibers.
Figure 2:
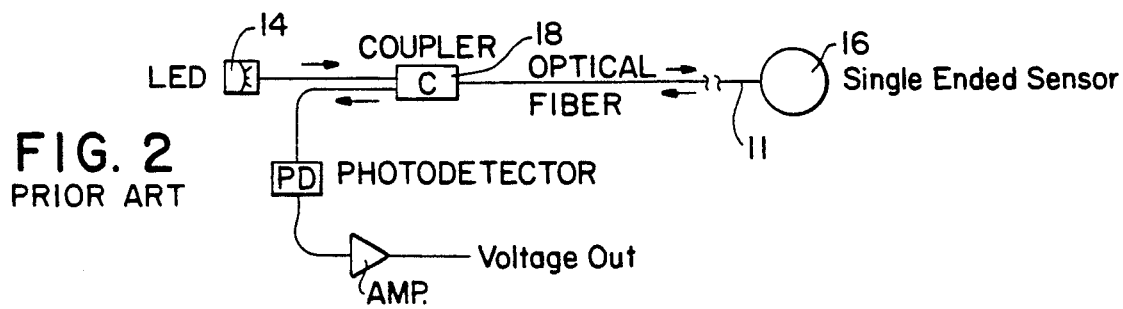
FIG. 2 is a view similar to FIG. 1 of a Prior art sensor architecture using one optical fiber.
Figure 3:
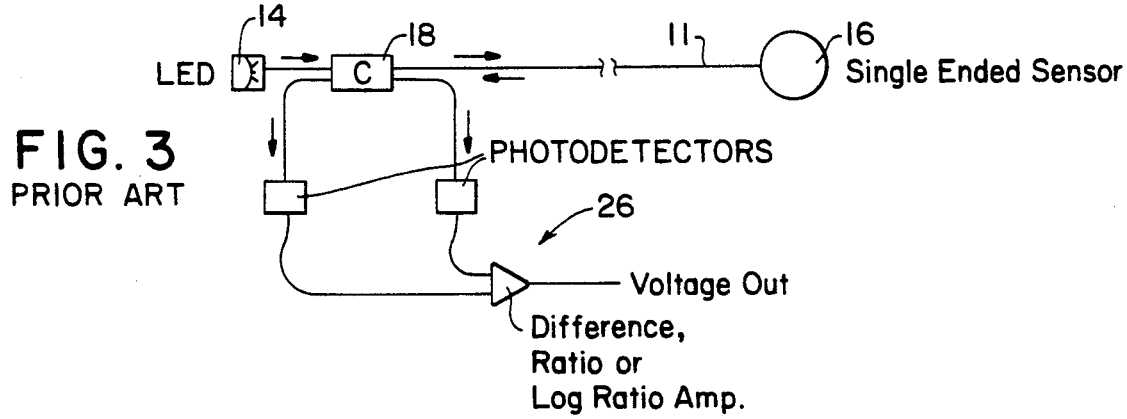
FIG. 3 is a view similar to FIG. 2 of another sensor architecture using one optical fiber.
Figure 4:
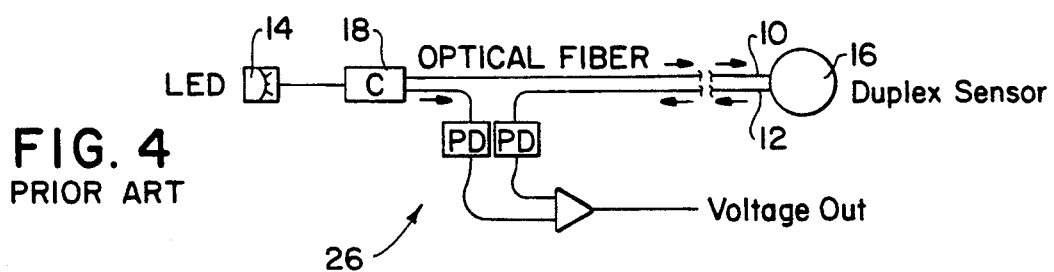
FIG. 4 is a view similar to FIG. 1 of a conventional sensor architecture using two optical fibers.
Figure 5:
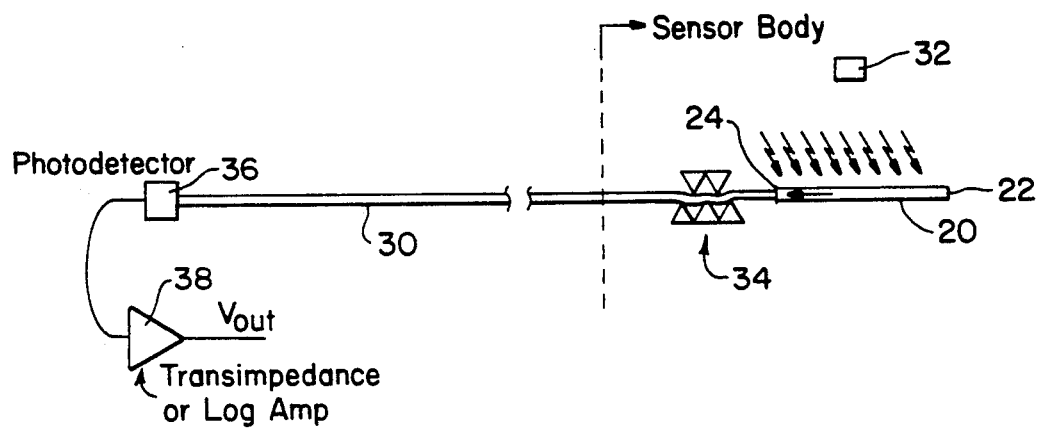
FIG. 5 is a schematic representation of one embodiment of the present invention.

Referring to FIG. 5, the invention embodied therein comprises a sensor positioned within a sensor body and containing a microbend modulator generally designated (34) which engages and varies the pressure on an active or sensing fiber (30). The modulator (34) is of any conventional type and measures a displacement or other parameter by changing the bending force applied to the optical fiber (30), thereby changing the transmission characteristic of the fiber to light passing through the fiber. The light is collected in a photodetector (36) which converts the light to a signal that is applied to a transimpedance or log amplifier (38) which produces an output voltage $V_{out}$ that is proportional to the light passing through the fiber and thus can be used to measure the parameter detected by the modulator (34).

The gist or essence of the invention is the use of a scintillating or fluorescing source fiber (20) as the light source of the microbend sensor.

Figure 8:
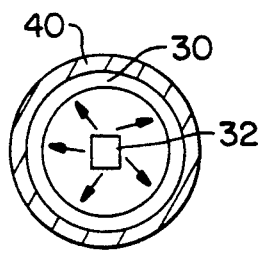
FIG. 8 is a schematic representation of an efficient energy confining chamber for use with the present invention.

For efficiency, one end (22) of the source fiber (20) can be mirrored and the other end (24) of the source fiber is fused or otherwise attached directly to the sensing fiber (30). Assuming that the source fiber is a BCF-28 fiber (Bicron Corporation, Newbury, Ohio) which emits in the green (approximately 480 nm), this fiber has a scintillation efficiency of about 1.6%, with the scintillation photons having an average energy of 2.5 eV. Assuming a square fiber geometry, the optical trapping efficiency of this fiber is about 4.4% each direction, or a total of 8.8% with a mirrored end. The range of 0.1 MeV electrons in this fiber is about 0.15 mm, thus a fiber of this size or larger will capture virtually all incident electrons with energy of 100 KeV or less and convert their energy to optical photons. A 15 Curie tritium source (32) is used in the embodiment of FIGS. 5 and 8. The radioactive decay is by beta emission with a mean energy of 6 KeV and a maximum energy of 18 KeV. The half-life of this isotope is 12.3 years. This source will undergo 5.55 E+11 disintegrations/second producing one electron in each disintegration. With the source (32) at the center of a hollow cylinder (40) shown in FIG. 8, the source fiber (30) is helically wrapped on the inside wall of the cylinder. With multiple wraps, the fiber can reasonably be expected to intercept about ⅔ of the emitted electrons, or about 3.7 E+11 electrons per second with an average energy of 6 KeV. With a scintillation efficiency of 1.6% and a mean scintillation photon energy of 2.5 eV, approximately 1.42 E+13 optical photons/second at a wavelength of about 480 nm are generated. This corresponds to an optical power of about 0.5 microwatt.

Conventional log or log ratio optoelectronics using silicon photodetectors have an effective noise equivalent power (NEP) of about 1 E−12

$$W/\sqrt{Hz}.$$

For a sensor with band width of 100 Hz, this corresponds to a minimum detectable power change of about 1 E−11 W. If the sensor is assumed to have a dynamic range of 3 dB and a resolution of 0.001 dB (0.03% FSR), the power required at the detector (34) (such that 0.001 dB=1 E−11 W) is equal to 0.043 microwatts. This provides a loss margin of over 10 dB, adequate for the optical architectures anticipated. Based on the half-life for tritium of 12.3 years, if optoelectronics are used which are not compensated for changes in the source brightness, the radioactive decay will produce a resolvable zero shift (0.001 dB) in approximately 35.9 hours, or about 0.24 db/year (8% of FS/year). For many applications this drift rate is acceptable. The radioactive decay will not result in any change in the sensitivity of the sensor. Effectively, every half-life, the source depletion will add 3 dB to the loss budget and thus will eventually result in a loss of resolution.

Figure 6:
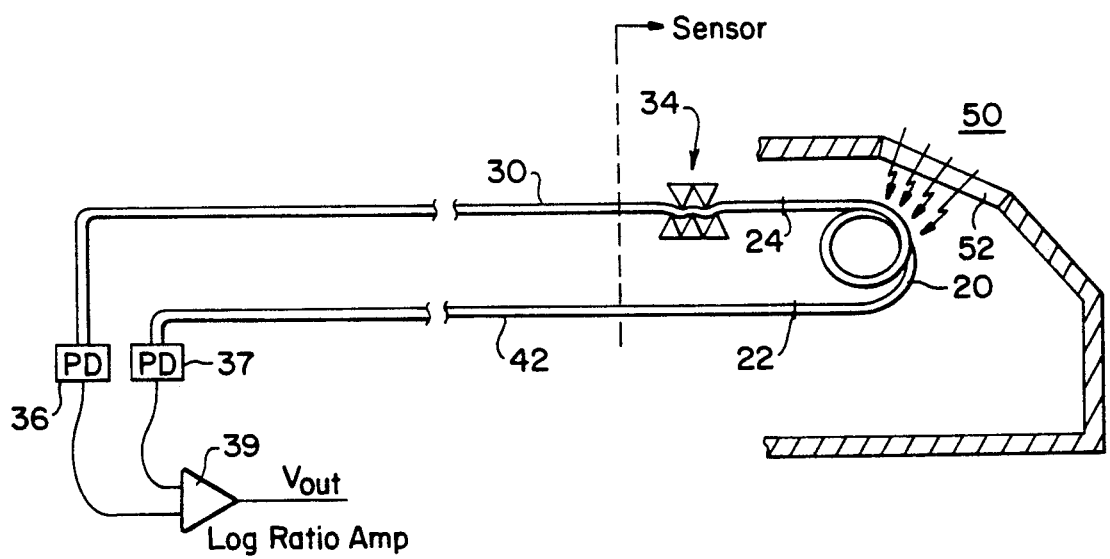
FIG. 6 is a view similar to FIG. 5 showing another embodiment of the invention.

In some applications, ambient light (50) through a transparent window (52) or cover may offer a more beneficial means to provide the energy to the source fiber (20). In such applications, a means for compensating for the variations in source brightness is required. A means for accomplishing this is shown in FIG. 6. This embodiment requires an additional reference fiber (42), but still provides the benefits of simplified optical architecture, elimination of the optical source and related components and reduction of the optical losses. The active or sensing fiber (30) is still used at the opposite end of source fiber (20).

In FIG. 6, modulated light passing through active optical fiber (30) is received by a first photodetector (36) and the unmodulated light from the opposite end (22) of source fiber (20), is supplied to a second photodetector (37). The voltage signals from both detectors are applied to a log ratio amplifier (39) with the output voltage $V_{out}$ providing the parameter measurement for the modulator (34).

It can be seen that radioactive sources other than tritium, such as Cobalt (60), Cesium (137), Europium (152), Nickel (63) or Strontium (90), offer potential benefits for providing the energy for the source fiber. Use of a source with more energetic emission characteristics reduces the required source activity, while increasing the scintillator thickness required for efficient capture and the shielding material thickness.

Figure 7:
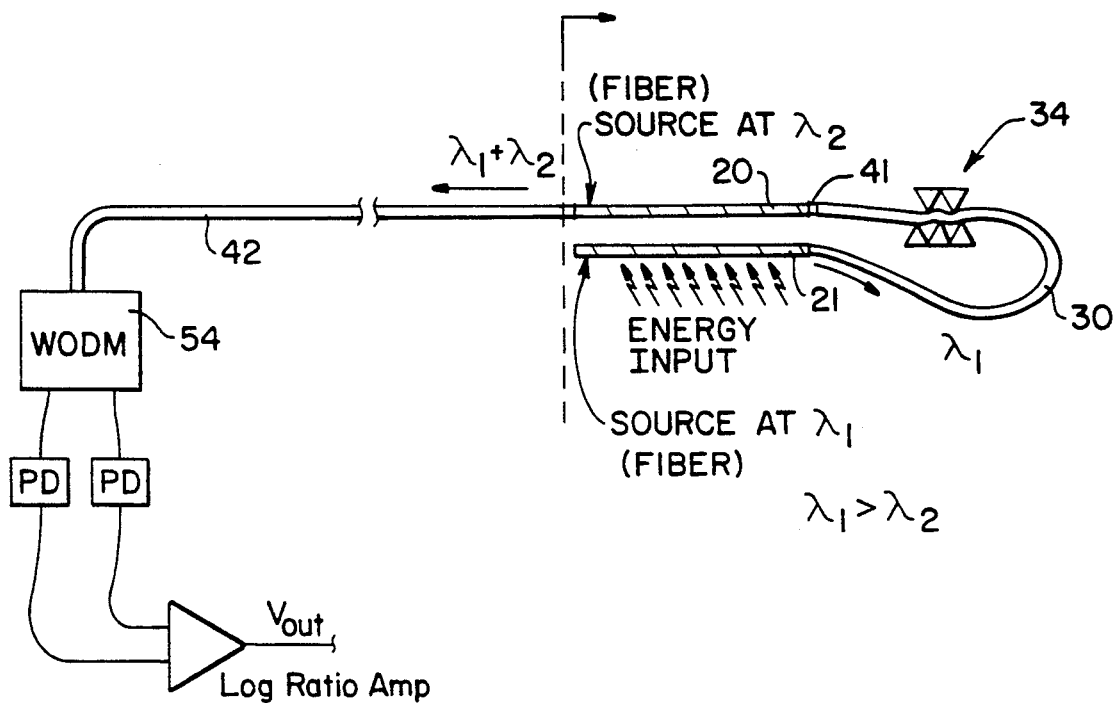
FIG. 7 is a view similar to FIG. 5 showing a still further embodiment of the invention.

For applications which may require wavelength division multiplexing to provide a high degree of immunity to cable motions and to variable insertion losses from mating/demating of connectors, a means for providing the needed wavelength division multiplexing is shown in FIG. 7. This embodiment uses two scintillating or fluorescing fibers (20, 21) which emit at different wavelengths $\lambda_1$ and $\lambda_2$. The source fiber 21 at wavelength $\lambda_1$ passes through the active fiber (30) and is modulated by the microbend sensor (34). The light at this wavelength passes through the second source fiber (20) to the extension fibers (42) and to the optoelectronics. The source fiber at wavelength $\lambda_2$ provides light directly to the extension fiber (42) without modulation by the microbender. To minimize cross-talk between the two wavelengths, a dichroic mirror (41) is interposed between the active fiber and the second (reference) source fiber, and the wavelength of the first source fiber is selected to be longer than the emission wavelength of the second source fiber. The light at the first (measuring wavelength does not significantly excite the source fiber at the second (reference) wavelength, and the reference wavelength is not significantly modulated by the microbender. In the optoelectronics, a WDDM (wavelength division de-multiplexer) (54) separates the two wavelengths which are then ratioed to provide the desired compensation for cable motion, insertion losses and other potential error sources. Since both fibers are excited by the same radioactive source, the systematic zero offset due to source depletion is eliminated with the architecture.

While the specific embodiments of the invention have been shown and described in detail to illustrate the application of the principles of the invention, it will be understood that the invention may be embodied otherwise without departing from such principles.

What is claimed is:

1. A sensor comprising:
   an optical sensor fiber for passing light with a transmission characteristic, the transmission characteristic changing as the sensor fiber is subjected to microbending;
   a microbending modulator operatively engaged with the sensor fiber for placing a microbend in the sensor fiber in response to an influence on the modulator to be sensed;
   photodetection means operatively connected to the sensor fiber for measuring changes in light from the sensor fiber caused by the microbend which is indicative of the influence; and
   a source fiber having one end connected to an end of the sensor fiber for supplying said light to the sensor fiber, the source fiber producing said light in the visible light range when exposed to energy radiated at the source fiber.

2. A sensor according to claim 1, including a housing for containing the source fiber, and said energy includes a source of radiation in the housing.

3. A sensor according to claim 2, wherein the source of radiation is selected from the group consisting of tritium, Cesium (137), Eyropium (152), Nickel (63), cobalt 60, and strontium 90.

4. A sensor according to claim 1 wherein the source fiber has an opposite end which is mirrored for reflecting said light produced by the source fiber to the one end of the source fiber.

5. A sensor according to claim 1, further comprising a cylindrical enclosure, said energy including a source of radiation in the cylindrical enclosure and the source fiber wrapped helically around an inside surface of the enclosure for receiving the radiation.

6. A sensor according to claim 1, wherein the source fiber comprises one of a scintillating and a fluorescent fiber.

7. A sensor according to claim 1, including an enclosure containing the source fiber and a window in the enclosure for admitting ambient light at a position to shine onto the source fiber.

8. A sensor according to claim 1, including a second source fiber having one end connected to an opposite end of the sensor fiber, the source fiber producing light at a higher wavelength that light produced at a second wavelength by the second source fiber, the photodetection means connected to an opposite end of the second source fiber for receiving light from the source fiber and receiving unmodulated light from the second source fiber, light from the source fiber having passed the sensor fiber and having been subjected to microbending by the microbend modulator, the photodetection means including means for wavelength division de-multiplexing of light at the higher wevelength coming from the source fiber and the second wavelength from the second source fiber.

9. A sensor according to claim 8, including a dichroic mirror between second source fiber and the sensor fiber for reducing cross-talk, between the two wavelengths of light.

10. A method of sensing an influence which causes a microbend modulator to place a microbend in an optical sensor fiber which passes light with a transmission characteristic, the transmission characteristic changing if the sensor fiber is subjected to microbending, comprising:
    exposing a source fiber to radiated energy, the source fiber being of the type which produces light in the visible light range when exposed to radiated energy; and
    attaching an end of the source fiber to the sensor fiber for supplying said light produced in the source fiber to the sensor fiber.

11. A method according to claim 10, including applying a mirror to an opposite end of the source fiber for reflecting light produced in the source fiber back to the one end of the source fiber and to the sensor fiber.

12. A method according to claim 10, including attaching a second source fiber to an opposite end of the sensor fiber, the second source fiber producing light at a lower wavelength than light produced by the source fiber; and detecting light received from the source fiber at one wavelength and light at the lower wavelength from the second source fiber with both wavelengths of light being subjected to wavelength division de-multiplexing to sense the influence of the microbending.

* * * * *